United States Patent [19]
Kreider

[11] 3,819,542
[45] June 25, 1974

[54] METHOD OF MAKING HIGH OPACITY RESIN POROUS FILMS AND AQUEOUS LATEX FOR PRODUCING SAID FILMS

[75] Inventor: Robert W. Kreider, St. Charles, Ill.

[73] Assignee: DeSoto, Inc., Des Plaines, Ill.

[22] Filed: Mar. 30, 1972

[21] Appl. No.: 239,719

[52] U.S. Cl. ............... 260/2.5 M, 260/2.5 R, 260/8, 260/17 A, 260/29.6 TA, 260/29.6 R, 260/29.6 RB, 260/29.6 MH, 260/29.6 ME, 260/29.6 WA, 264/49
[51] Int. Cl. ......................... C08f 45/24, C08j 1/14
[58] Field of Search .................... 260/2.5 M; 264/49

[56] References Cited
UNITED STATES PATENTS

| | | | |
|---|---|---|---|
| 3,450,650 | 6/1969 | Murata | 260/2.5 M |
| 3,554,789 | 1/1971 | Kigane et al. | 264/49 |
| 3,661,807 | 5/1972 | Seiner | 260/2.5 M |

*Primary Examiner*—Murray Tillman
*Assistant Examiner*—Morton Foelak
*Attorney, Agent, or Firm*—Dressler, Goldsmith, Clement & Gordon, Ltd.

[57] ABSTRACT

An aqueous latex coating composition adapted to deposit films which dry to form a cellular layer of high opacity is provided by swelling the resin particles of the aqueous latex with a primary organic solvent which is essentially immiscible in the aqueous phase of the latex, such as xylene, and by introducing into the aqueous phase an at least partially water miscible organic solvent, such as propylene glycol, having a lower evaporation rate and a lesser capacity for solvating the resin of the latex than said primary solvent. When the primary solvent evaporates, a cellular film is formed with the secondary solvent serving to increase the opacification which is obtained.

15 Claims, No Drawings

METHOD OF MAKING HIGH OPACITY RESIN POROUS FILMS AND AQUEOUS LATEX FOR PRODUCING SAID FILMS

The present invention is directed to the provision of aqueous latex coating compositions in which the resin particles of the latex are constituted by polymer of low opacity, the deposited latex drying to produce a cellular film which is opaque because the cells of the film function to scatter light.

It is known in the application of aqueous latex coating compositions to include a small proportion of organic solvent in the latex, this organic solvent normally functioning to enhance the coalescence of the polymer particles in the film which is deposited. This may aid in the formation of a continuous film using resin particles possessing a high glass transition temperature, but it does not contribute to the development of film opacity. Indeed, such a solvent by encouraging the formation of a continuous and uniform film, may actually serve to reduce film opacity. It is also possible to include in the aqueous latex, a proportion of water immiscible organic solvent, such as xylene, the xylene solvent being absorbed into the polymer particles to swell the same. When an aqueous latex coating composition containing resin particles swollen with water immiscible organic solvent is deposited and dried, the water immiscible solvent evaporates from the film which is formed, producing porosities or cells. As will be understood, the presence of porosities or cells causes light scattering and internal reflection to take place which provides an appearance of opacity. However, the xylene-swollen cells are soft and the cell walls have little strength. As a result, the cellularity which is induced is limited, apparently because many of the cells collapse and this limits the opacity which is obtained. Cell collapse is apparently induced primarily by the capillary pressures which are generated as the water evaporates while the particles coalesce. As a result, the achievement of opacity-inducing cellularity is largely limited to the use of an aqueous latex in which the dispersed particles are composite particles as in my prior application Ser. No. 239,303, filed Mar. 29, 1972, now abandoned.

In accordance with the present invention, I have found that when a secondary organic solvent is employed which is at least partially water miscible so that the secondary solvent remains largely in the aqueous phase of the latex, and when this secondary organic solvent has a lower evaporation rate than the primary solvent together with a lesser capacity for solvating the resin particles of the latex, then as the primary solvent evaporates during film formation, the cell walls are better maintained during the evaporation process and, as a result, a much greater opacification is obtained.

It is theorized that the secondary organic solvent diffuses into the cells as the primary solvent evaporates from the cells. In this way, it is thought that the cellular structure is maintained against the collapsing capillary pressures which are generated as the water evaporates from the film. At the same time, the secondary solvent with its reduced solvating capacity increases the dimensional stability of the film. As a result, and by the time the secondary solvent evaporates, the film as well as the cells therein are stabilized and the capillary collapsing forces are no longer present so that, and with the passage of time, the cells are emptied of solvent and air spaces are provided to produce the light scattering and internal reflection which create the appearance of opacity.

It is also possible that the water miscible solvent concentrates around the polymer particles as the water evaporates so that these particles softened by the water immiscible organic solvent swelling the same collapse around the water miscible solvent as these particles coalesce to entrap the water miscible solvent which evaporates subsequently to form the opacity-inducing voids. This would provide a phase inversion, leaving the polymer as the continuous phase encircling cells formed by the evaporation of the water miscible solvent. It is not unlikely that both of the mechanisms discussed above occur at the same time or in sequence. Regardless of theory, the fact that this invention provides a porous film in which the resin phase is continuous enables these films to possess desired toughness, strength, and adhesion.

It is desired, however, to point out that the above theoretical discussion is not a limitation of this invention and, indeed, it is difficult to verify theoretical considerations because the cells which are formed are exceedingly small, usually having a diameter in the range of about 0.3–1.5 microns, and it is difficult to see those cells having a diameter less than 1 micron when ordinary optical microscopes are used. Additionally, the cells produce considerable light scattering which further serves to obscure the cells.

Referring first to the polymer particles which are dispersed in the aqueous continuum of the latex, the chemical nature of these polymer particles is of secondary importance. In preferred practice, and for the purpose of forming a film which will air dry, it is preferred to employ a polymer particle having a low glass transition temperature below 25°C., preferably below 0°C. However, polymer particles possessing higher glass transition temperatures may be used, especially when a moderate bake is used to enhance the coalescence of the polymer particles.

There is also normally employed a dispersing agent in order that the polymer particles will be stably dispersed in the aqueous continuum of the latex. The dispersing agent is normally constituted by a surface active agent which preferably includes a proportion of nonionic surface active agent. These surface active agents are normally present as the result of copolymerization in aqueous emulsion. The nonionic surfactants are not essential and, particularly when the primary organic solvent is aromatic, such as xylene or toluene, it has been found that anionic surface active agents, such as dodecylbenzene sulfonic acid or sodium lauryl sulfate, are particularly beneficial. Excessive proportions of surfactant, especially nonionic surfactant, can plasticize the polymer particles and undesirably soften them, and should be avoided.

As will later be more fully discussed, the primary and secondary solvents are selected based on their capacity to solvate the polymer which is employed in the polymer particles and this will vary depending upon which polymer is selected. Thus, and while the chemical constitution of the polymer particle is not of primary significance, the chemical constitution of the polymer must be kept in mind in order to properly determine which organic solvents can be used.

In the preferred practice of this invention, the polymer particles are constituted by a copolymer of 20 percent by weight of ethylene with 80 percent by weight of vinyl acetate produced by copolymerization in aqueous emulsion. This provides a latex containing at least 20 percent by weight of polymer particles with the surfactant used being present in an amount below the critical micelle concentration so that the polymer particles can be used as a seed within which an approximately equal proportion of styrene is post polymerized. The composite polymer particles so-produced and their production are more fully described in my said companion application Ser. No. 239,303, filed Mar. 29, 1972, now abandoned. This same application discloses other composite polymer particles which may be used herein. As pointed out in said application, the final aqueous latex has a continuous aqueous phase in which is stably dispersed polymer particles of low glass transition temperature (below 25°C., preferably below 0°C.) having monomer which produces a polymer of high glass transition temperature (above 30°C.) polymerized therein.

On the other hand, the polymer particles need not be composite particles as described in my said application, but these may instead be polystyrene or polymethyl methacrylate emulsion polymers or emulsion copolymers containing styrene, methyl methacrylate or the like, together with, for purposes of illustration, from 5-25 percent of ethyl acrylate or butyl methacrylate or other monovinyl ester. When the noted homopolymers are used, baking is normally employed to help form a continuous film. Mixtures of polymer particles of low glass transition temperature with polymer particles of high glass transition temperature are also useful as, for example, 50 parts of polystyrene latex with 50 parts of a 20/80 ethylene/vinyl acetate copolymer latex. The air dry films made in this manner exhibit the opacity which is the primary purpose of this invention, but the blocking resistance obtained using composite particles and the physical toughness and adhesion obtained using composite particles is not duplicated. It is again stressed that all that is required herein from the standpoint of the polymer particle and the primary solvent is that the polymer particles be stably suspended in the aqueous medium and be capable of absorbing water immiscible organic solvent to cause the polymer particle to swell. Of course, the larger particles require less swelling to induce good opacification. In preferred practice, the polymer particles which are swollen by water immiscible solvent should have an average particle size of at least about 0.5 micron.

From the standpoint of the swollen polymer particle, a 5 percent volumetric increase in the polymer size is usually adequate. Indeed, it has been found that as little as 5 parts by weight of the primary solvent, per 100 parts of polymer, is enough to swell the polymer particles adequately to induce a degree of cellular formation on drying. It is preferred, however, to use a larger proportion of primary solvent, e.g., at least about 15 parts by weight of primary solvent per 100 parts by weight of polymer. In preferred practice, it has been found that from about 20 to about 80 parts of primary solvent per 100 parts of polymer are preferred, but it will be kept in mind that from the practical standpoint it is desired to employ as little of the primary solvent as is consistent with the development of the best opacity.

The primary solvent which is employed should be essentially water immiscible. By this, it is meant that at least half of the primary solvent which is initially placed in the aqueous phase migrates from this phase into the polymer particles in order to swell the same. Conversely, less than 50 percent of the primary solvent remains in the aqueous phase. The primary solvent on being absorbed into the polymer particle necessarily swells the same, but there is a limit to the extent of solvency which can be tolerated since, when the primary solvent has an excessive capacity to dissolve the polymer particle, there results a degree of emulsion instability causing coagulation of the emulsion. The use of a small amount of divinylbenzene or polyacrylate or the like to cross-link the polymer particle increases the capacity to handle large amounts of primary solvent. The careful addition of emulsion stabilizer while the solvent is added also helps to prevent undesired coagulation. Aromatic solvents such as benzene, xylene, toluene, ethylbenzene, and the like, will illustrate primary solvents which are applicable to the swelling of all of the polymer particles which are contemplated. Water immiscible aliphatic solvent which are adequately absorbed by the polymer particle are also applicable for use as the primary solvent, butyl Carbitol acetate and ethyl Carbitol acetate (Carbitol identifies diethylene glycol) being illustrative of this class of materials. The desired swelling of the polymer particles requires absorption of at least about 5 percent by weight of the primary solvent. Preferred primary solvents are less volatile than water.

The secondary organic solvent constitutes the key to this invention in the combination under consideration. First, the secondary solvent must be at least partially water miscible so that the major proportion thereof remains in the water phase and does not migrate into the polymer particles until after the latex has been deposited and the water content of the latex largely evaporated. Preferred secondary solvents in accordance with this invention are illustrated by ethylene glycol, diethylene glycol, propylene glycol, butylene glycol, polyethylene glycol having a molecular weight of about 150 and the like. 2-ethoxy ethanol and 2-ethoxy ethylene glycol will further illustrate the secondary solvents which may be used, but these tend to upset the stability of the emulsion and must be used with care, e.g., the proportion of use should be limited. In some instances where the primary solvent is sufficiently volatile, butyl alcohol may be used as the secondary solvent.

After the latex is deposited and a portion of the water evaporates, the water miscible organic solvent in the aqueous phase concentrates about the polymer particles in the deposited film and, it is thought, diffuses into the cells which are formed by the evaporation of the primary solvent. For this purpose and in normal practice, at least 20 parts of secondary solvent are desirably present per 100 parts of polymer particle. As little as about 5 parts of secondary solvent on the same basis provides limited improvement. It is preferred to employ a ratio of primary to secondary solvent such that the primary solvent is present in a weight ratio in the range of 2:1 to 1:3 with respect to the secondary solvent. A ratio of 25-50 parts of primary solvent to 50 parts of secondary solvent per 100 parts of polymer is presently considered to constitute best practice.

It is desired that the secondary solvent have a reduced capacity for solvating the polymer particles. In this way, the secondary solvent will stabilize the film when it finally enters the cells.

It will be understood that the opacification which is desired in the invention is not obtained immediately when the latex is deposited and forms a film. Instead, opacity is developed with the passage of time as the primary and secondary solvents evaporate from the film. Naturally, the rate of volatilization will increase with the baking temperature, if the film is baked, but it is preferred to employ systems which air dry. The time for developing opacity can vary considerably, but this function normally requires several hours. In an illustrative situation, a contrast ratio of 0.55 is obtained in about 2½ hours whereas maximum opacification to a contrast ratio of 0.93 is obtained in about two days. Baking is particularly preferred to speed opacification after the water has been removed as part of film formation.

In order to determine the contrast ratio, the latex is drawn down across a sheet having a black area and a white area. The reflectance is then measured over the deposited coating, first over the white undersurfaced area, and then over the black undersurfaced area. The ratio of these two reflectances provides a contrast ratio which determines the degree of opacification. When the deposited coating is completely clear, the reflectance is very high over the white area, and is neglgible over the black area providing a contrast ratio near O. On the other hand, when the deposited coating is highly opaque, then the reflectance over each of the two areas is about the same and a perfect opacification would be evidenced by a contrast ratio of 1.0. From the standpoint of commercial practice, a contrast ratio of 0.88 or higher is considered to provide reasonably good performance. On the other hand, and in accordance with this invention, contrast ratios of 0.90 and higher are consistently obtained. These are normally measured in a dry film having a thickness in the range of 1.0–1.7 mils (6 mils wet).

As previously indicated, this invention is especially applicable to the composite particle-containing latices disclosed in my said copending application in which a polymer of high glass transition temperature is formed within a polymer particle of low glass transition temperature. These composite particles possess essentially the low glass transition temperature of the original polymer particle or seed from which the composite was produced. This is evidenced by the capacity of the particles to coalesce on air drying despite the presence of a large proportion of polymerized monomer which normally produces a polymer which does not coalesce on air drying. In this invention, the primary solvent on evaporation appears to convey a proportion of high melting polymer to the surface of the film so that the final film is not sticky and resists blocking in the absence of any curing reaction. This is unusual for air dry films which are unpigmented and is quite surprising.

This facet of the primary solvent to cause stratification suggests that different solvents will do this to different extents, enabling a control of gloss. In fact, 2-ethoxy ethanol and methyl isobutyl ketone yield higher gloss than does ethylbenzene.

The primary solvent can also be used to pull solvent-soluble dyes into the polymer particles and this provides a desirable technique for introducing chromatic effects. Very low proportions of dissolved dye yield films possessing deep tones so that this technique provides very attractive colors, and does so with great economy. This is illustrated by dissolving 0.25 part of a dye such as azo-oil-Blue Black dye (General Aniline) in 24.75 parts of xylene, and this was used in place of xylene itself to produce a film which was not only opaque, but which was colored a medium shade of blue with moderate intensity. This is a considerable depth of color from a very small amount of dye.

The invention is illustrated in the examples which follow, in which all parts are by weight.

EXAMPLE 1

1512 parts of an ethylene-vinyl acetate seed polymer latex (see note 1) are mixed with 304.0 parts of distilled water in a 3 liter flask. The ethylene-vinyl acetate polymer contains about 20 percent ethylene, 80 percent vinyl acetate, with a trace (0.15 %) of methacrylic acid. The latex has a solids content of 52.8 percent and the particles have an average particle size of 0.46 micron (by light scattering).

16 parts of divinyl benzene (commercial material containing 53 percent divinyl benzene, balance largely styrene, vinyl toluene and ethylbenzene) are dissolved in 768 parts of styrene, and the solution is added to the seed latex in the flask with stirring for 15 minutes. Heat is slowly applied (45 minutes) until the flask contents are at 65°C. at which time there is added a solution of 4.0 parts potassium persulfate in 160 parts of distilled water. The temperature is maintained at 65°C. and a solution of 26.6 parts of the sodium salt of dodecyl benzene sulfonic acid in 488 parts of distilled water is slowly added over a period of 1½ hours. In this way, the latex is maintained close to its point of instability to minimize the proportion of anionic surfactant in the water phase. The 65°C. temperature is then maintained for an additional 3½ hours whereupon the product is cooled to 30°C., removed from the flask, and filtered through a 60 mesh screen.

Note 1 — The seed polymer latex is made by precharging a pressure vessel with 2,500 grams of water, 44 grams of hydroxyethyl cellulose, 6.6 grams of sodium bicarbonate, 154 grams of an ethylene oxide condensate with isooctyl phenol (10 mols of oxide per mol of phenol), and 22 grams of potassium persulfate. The feed lines to the vessel are rinsed with 1252 grams of water (degassed). It is estimated that the pressure vessel included 35 grams of residual water from a previous run. The reactor is closed and then heated with agitation and, at 80°C., the vessel is pressurized with ethylene to a pressure of 800 p.s.i.g. Also, at 80°C., vinyl acetate containing a trace of glacial methacrylic acid is added slowly. Over 2½ hours, 3513.4 grams of vinyl acetate and 6.6 grams of methacrylic acid are added while the temperature of 80°C. and the pressure of 800 p.s.i.g. are maintained. Then, 4.5 grams of potassium persulfate in 220 grams of water are added rapidly and the feed lines are rinsed into the vessel with 160 grams of water (it is estimated that 60 grams of water are held up in the feed lines). The temperature is then raised to 85°C. and held for 1 hour before cooling to provide the desired final product.

It is desired to point out that Example 1 provides an aqueous latex containing dispersed composite polymer particles. On coating and air drying, these polymer particles coalesce to form a hard, tough and adherent continuous film on metal, paper, glass etc. The polymer particles, by microscopic examination, have an average particle size of about 1 micron. The deposited film, without pigment, is translucent and has a contrast ratio of 0.15 at about 1.5 mil dry film thickness.

EXAMPLE 2

213 grams of the latex of Example 1 (100 grams of polymer solids) are placed in a flask and 6 grams of the ethylene oxide condensate with isooctyl phenol (10 mols of the oxide per mol of the phenol) dissolved in 50 grams of propylene glycol are added, while stirring, at room temperature. Then, 35 grams of xylene are added with stirring at room temperature, and stirring is continued for 1 hour. At the end of 1 hour agitation, all the xylene had been absorbed as evidenced by the fact that no phase separation occurs on standing. To make the solution more viscous, 25 grams of a 2 percent aqueous solution of hydroxyethyl cellulose (high viscosity preferred) are added and stirred in for five minutes to provide a uniform mixture.

The latex so-provided is then drawn down on various substrates, paper, metal, glass, wood, etc. to deposit a film which air dries. A 6 mil wet film was drawn down on sealed paper black on one end and white on the other (a hiding power chart). The air dried film was initially translucent, with a contrast ratio of about 0.15. After 2½ hours of further exposure to the air, the contrast ratio rose to about 0.45. After 4 hours exposure, the contrast ratio was about 0.70. After 1 day, the contrast ratio was 0.93.

Substantially the same results are obtained by omitting the xylene in Example 2 and instead using the same proportion of xylene with respect to resin in Example 1 by dissolving the styrene in the xylene so that the added styrene which is subsequently polymerized in Example 1 is added in xylene solution. The final contrast ratio was the same, but it developed more rapidly, and the surface of the film was smoother.

The divinyl benzene in Example 1 is not essential. In the absence of the divinyl benzene, the 1 day contrast ratio was 0.90 instead of 0.93. Thus, the divinyl benzene helped to achieve best results and is presently preferred.

The hydroxy ethyl cellulose used in Example 2 is not essential, especially when the latex is applied by spray where the bodying action which it provides is not needed. As a matter of interest, the hydroxy ethyl cellulose induces flatness and water sensitivity and is preferably excluded from semi-gloss or gloss paints, particularly for exterior application.

The invention is defined in the claims which follow.

I claim:

1. A method of forming a film of high opacity from resin of low opacity comprising depositing a film of an aqueous latex coating composition consisting essentially of an aqueous continuous phase having stably suspended therein polymer of emulsion polymerized unsaturated monomer in the form of particles of low opacity organic solvent-soluble resin, said polymer particles being swollen by having absorbed therein at least 5 parts by weight per 100 parts of polymer of a primary organic solvent which is essentially immiscible in the aqueous phase of said latex, and at least 5 parts by weight per 100 parts of polymer of a secondary water-miscible organic solvent in said aqueous phase, said secondary organic solvent having a lower evaporation rate than said primary solvent and a lesser capacity for solvating said polymer, drying said film to form a dried film of low opacity, and then further drying said film to remove said organic solvents and thereby generate opacity-inducing cells in said film.

2. A method as recited in claim 1 in which said primary organic solvent is used in an amount of from about 20 to about 80 parts per 100 parts of polymer.

3. A method as recited in claim 1 in which said polymer particles have a glass transition temperature below 25°C.

4. A method as recited in claim 1 in which said solvent-swollen polymer particles have an average diameter of at least about 0.5 micron.

5. A method as recited in claim 1 in which said primary organic solvent is aromatic.

6. A method as recited in claim 1 in which said primary organic solvent is selected from ethyl and butyl Carbitol acetate.

7. A method as recited in claim 1 in which said secondary solvent is a volatile glycol.

8. A method as recited in claim 1 in which said primary solvent is present in a weight ratio with respect to said secondary solvent of 2:1 to 1:3.

9. A method as recited in claim 1 in which said polymer particles are particles of polymer having a glass transition temperature below 25°C. modified by having monomer which produces a polymer having a glass transition temperature above 30°C. post polymerized in their presence.

10. A method as recited in claim 9 in which said polymer particles are particles of ethylene-vinyl acetate copolymer in a latex having a monomer polymerized therein selected from the group of styrene, vinyl toluene and methyl methacrylate.

11. A method as recited in claim 1 in which said water immiscible organic solvent has solvent-soluble dye dissolved therein.

12. A method as recited in claim 1 in which the polymer particles of said latex are selected from emulsion polymers and emulsion copolymers containing styrene or methyl methacrylate.

13. A method as recited in claim 12 in which mixtures of polymer particles of low glass transition temperature with polymer particles of high glass transition temperature are used.

14. A method as recited in claim 12 in which said secondary solvent is propylene glycol.

15. An aqueous latex coating composition adapted to deposit a film of low opacity resin which dries to produce a cellular film of high opacity, consisting essentially of an aqueous continuous phase having stably suspended therein polymer of emulsion polymerized unsaturated monomer in the form of particles of low opacity organic solvent-soluble resin which is a mixture of polymer having a glass transition temperature below 25°C. and polymer having a glass transition temperature above 30°C., said polymer particles being swollen by having absorbed therein at least 5 parts by weight per 100 parts of polymer of aromatic hydrocarbon, and at least 5 parts by weight per 100 parts of polymer of propylene glycol in said aqueous phase, whereby, when said latex is deposited and dried, said solvents will evaporate to produce a film containing opacity-inducing cells.

* * * * *